United States Patent
Okusawa et al.

(10) Patent No.: US 6,442,938 B2
(45) Date of Patent: Sep. 3, 2002

(54) WASTE PROCESSING SYSTEM AND FUEL REFORMER USED IN THE WASTE PROCESSING SYSTEM

(75) Inventors: Tsutomu Okusawa; Kazuhito Koyama; Masahiko Yamagishi; Shigeo Hatamiya; Taiko Ajiro, all of Hitachi; Megumi Sunou, Ibaraki; Yukio Ishigaki, Hitachi; Kenji Tokunaga, Tokyo, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/781,439

(22) Filed: Feb. 13, 2001

Related U.S. Application Data

(62) Division of application No. 09/343,273, filed on Jun. 30, 1999, which is a continuation of application No. 08/959,026, filed on Oct. 28, 1997, now Pat. No. 6,014,863.

(51) Int. Cl.⁷ .................................................. F01K 7/34
(52) U.S. Cl. ........................................ 60/653; 60/676
(58) Field of Search ........................ 60/653, 650, 670, 60/676, 39.12, 39.5; 110/342, 344, 229, 233, 346

(56) References Cited

U.S. PATENT DOCUMENTS 3,367,882 A * 2/1968 Marshall, Jr.
5,432,710 A * 7/1995 Ishimaru et al. ............. 364/493
6,218,439 B1 * 4/2001 Kobayashi et al. .......... 518/713
6,254,839 B1 * 7/2001 Clason et al. ................ 422/190

FOREIGN PATENT DOCUMENTS

| JP | 2-286835 | 11/1990 |
| JP | 5-332166 | 12/1993 |
| JP | 5-332167 | 12/1993 |
| JP | 7-103443 | 4/1995 |
| JP | 7-127801 | 5/1995 |
| JP | 8-68528 | 3/1996 |

* cited by examiner

*Primary Examiner*—Hoang Nguyen
(74) *Attorney, Agent, or Firm*—Mattingly, Stanger & Malur, P.C.

(57) ABSTRACT

A waste-to-energy incineration system, in which the amount and the heat value of exhaust gas largely changes in long and a short periods, comprises an incinerator for burning waste, a boiler in the incinerator for generating steam with exhaust heat generated by the incinerator, a superheater for superheating steam generated in the boiler, a steam turbine driven by steam superheated by the superheater, a generator driven by the steam turbine, a fuel reformer for reforming source fuel, and a combustor burning fuel gas reformed by the fuel reformer and at least a part of exhaust gas led from the incinerator which is able to stably decompose generated dioxin in waste incineration exhaust gas.

5 Claims, 7 Drawing Sheets

WASTE PROCESSING SYSTEM AND FUEL REFORMER USED IN THE WASTE PROCESSING SYSTEM

This is a divisional application of Ser. No. 09/343,273, filed Jun. 30, 1999, which is a continuation application of U.S. Ser. No. 08/959,026, filed Oct. 28, 2997, now U.S. Pat. No. 6,014,863.

BACKGROUND OF THE INVENTION

1. Field of the Invention

The present invention relates to a fuel reformer and a waste processing system including a fuel reformer, and especially to a direct heat exchange type, non catalyst fuel reformer, and a waste-to-energy incineration system in which a direct heat exchange type, non catalyst fuel reformer is adopted.

2. Description of Related Art

As a fuel reformer for reforming source fuel such as hydrocarbon material to a gas containing hydrogen, an indirect heat exchange type fuel reformer or a direct heat exchange type reformer has been largely used. Further, there are two types of fuel reformers, that is, a fuel reformer using a catalyst and a fuel reformer which does not use a catalyst.

In an indirect heat exchange type fuel reformer, a reaction tube and a burner are provided. While the reaction tube is heated by the combustion gas from the burner, raw gas enters the reaction tube at an end of the reaction tube. Further, the raw gas is partially oxidized (so-called partial combustion), and reformed to gas including hydrogen, either by using a catalyst or by using coolant steam on a basis of hydrothermal reaction.

On the other hand, in an direct heat exchange type fuel reformer, the heat required for reforming raw fuel is directly given to raw fuel flowing in a fuel flowing path by partial oxidization, which results in a high temperature gas of raw fuel. The high temperature raw fuel (hereafter, referred to as fuel for simplicity) is reformed to gas including hydrogen, either by using a catalyst or by using a steam coolant on a basis of hydrothermal reaction. In a chemical industrial plant, a direct heat exchange type reformer is mainly used.

In the method of using a catalyst, since the catalyst can lower the reforming energy, that is, the reforming temperature to about 700° C., only 20% of the fuel is consumed for partial oxidization.

In the method of using no catalyst, due to the absence of a catalytic energy saving effect, more than 20% of the fuel is required for partial oxidization in order to obtain a reforming energy, that is, the reforming temperature as high as 1300° C.

One of features of the waste-to-energy incineration system is that the generated heat changes due to changes of the amount of waste to be processed, depending on the day, the season or the year, which is particular to the waste processing. Further, since the waste processing is requested to be performed without stopping of operations, in addition to the above-mentioned feature, a maintenance-free composition or structure is strongly required for the waste-to-energy incineration system. For satisfying the above-mentioned requirement, each apparatus composing the system should be composed of long-service parts. To realize the above-mentioned apparatus, the method in which a catalyst is not used, is advantageous. However, in this method, it is indispensable to produce energy necessary for reforming fuel gas by partially oxidizing more than 20% of fuel in order to reform fuel gas with the partial oxidation heat itself of fuel gas. (Hereafter, a fuel reformer mainly indicates a fuel reformer without a catalyst, in which more than 20% of fuel is partially oxidized.)

An existing fuel reformer has been usually used, for example, in a gas turbine power generation system. Further, a power generation system in which a fuel reformer is provided, is disclosed in JP-A-286835/1990, JP-A-332166/1993 and JP-A-332167/1993.

Since the previously-mentioned indirect heat exchange type fuel reformer includes a burner for heating a reaction tube, such a fuel reformer has a problem in that the size of the apparatus becomes large, and an external heat source has to be provided.

On the other hand, a direct heat exchange type fuel reformer is superior to an indirect heat exchange type fuel reformer in the point that the fuel itself produces a heat source for reforming fuel gas by partially oxidizing the fuel. In addition, due to the absence of a burner and a reaction tube, the size of the fuel reformer can be reduced in comparison with the indirect heat exchange type.

One of the objects of the waste-to-energy incineration system is to burn waste and decrease the volume of waste, without polluting the environment. Another objects is to generate power by utilizing the heat generated in burning waste. Therefore, it is very important to remove hazardous material from exhaust gas generated in an incinerator. In particular, removal of dioxin has been a very pressing subject.

The apparatuses disclosed in JP-A-286835/1990, JP-A-332166/1993 and JP-A-332167/1993 are mainly used for a gas turbine power generation System. The above-mentioned subject is out of the question with these devices because of using fuel different from the waste. Therefore, the conventional reformer are not based on the same subject. Further, since various kinds of waste are burned in an incinerator, the amount of generated heat changes hour by hour, month by month and year by year. Consequently, since the amount of fuel fed to a fuel reformer changes, corresponding to the amount and the components of gas exhausted from the incinerator, an existing direct heat exchange type fuel reformer a problem, that a fire-proofing brick structure part inside the incinerator is easily damaged and worn out due to the changes in the generated heat.

SUMMARY OF THE INVENTION

Objectives of the Invention:

The present invention is intended to solve the above-mentioned problems, and the objectives of the present invention are as follows.

A first objective of the present invention is to provide a waste-to-energy incineration system which is able to stably decompose generated dioxin, in which the composition and the heat value of exhaust gas fluctuates over time, and which utilizes reformer.

A second objective of the present invention is to provide a waste-to-energy incineration system and a fuel reformer which are able to stably decompose generated dioxin and to suppress NOx generation.

A third objective of the present invention is to provide a waste-to-energy incineration system having a highly reliable performance with respect to dioxin decomposition and a highly efficient waste-to-energy incineration performance.

Method of Solving the Problem:

To attain the above-mentioned first and third objectives, the present invention provides a waste-to-energy incineration system, comprising:

an incinerator for burning waste;

a boiler in the incinerator for generating steam by using exhaust heat generated by the incinerator;

a superheater for superheating steam generated in the boiler;

a steam turbine driven by steam superheated by the superheater;

a generator driven by the steam turbine;

a fuel reformer for reforming fuel; and a combustor burning fuel gas which is reformed by the fuel reformer, and at least a part of an incinerator exhaust gas.

Further, in a waste-to-energy incineration system, the system comprises:

an incinerator for burning waste;

a boiler in the incinerator for generating steam with exhaust heat generated in the incinerator;

a steam utilizer for utilizing steam generated in the boiler; and a fuel reformer for reforming fuel;

wherein fuel gas reformed by said fuel reformer is led to said incinerator.

Further, in a waste-to-energy incineration system, the system comprises:

an incinerator for burning waste;

a first boiler in the incinerator for generating steam with exhaust heat generated in the incinerator;

a steam utilizer for utilizing steam generated in the boiler;

a second boiler different from the first boiler;

a fuel and reformer for reforming fuel;

a combustor for burning fuel gas which is reformed by the reformer, and at least a part of an incinerator exhaust gas;

wherein steam generated by the second boiler is led to the fuel reformer.

To attain the above-mentioned second objective, the present invention provides a waste-to-energy incineration system, comprising:

an incinerator for burning waste;

a boiler in the incinerator for generating steam by using exhaust heat generated in the incinerator;

a superheater for reheating steam generated in the boiler;

a steam turbine driven by steam led from the superheater;

a generator driven by the steam turbine;

a fuel reformer for partially oxidizing the amount more than 20% of a source fuel; and a combustor for burning fuel gas which is reformed by the fuel reformer, and at least a part of an incinerator exhaust gas.

In the above-mentioned waste-to-energy incineration systems, steam extracted from a steam feed-water system consisting of the incinerator boiler, the superheater, and the steam turbine or the steam utilizer is used as a cooling medium injected in the fuel reformer. Further, at a place of the steam feed-water system, a feed-water evaporator utilizing exhaust gas from the combustor as a heat source is provided, and steam generated from water heated by the feed-water evaporator is used as a cooling medium injected in the fuel reformer.

Further, the above-mentioned fuel reformer includes a first chamber for reforming fuel and a second chamber adjacent the first Chamber, and outside of the first chamber, for leading steam as a cooling medium into the first chamber.

Further, in the first chamber, a fuel reforming reaction heat source is obtained by partially oxidizing a source fuel and the source fuel is reformed. Further, the fuel reformer includes a fuel flowing path for generating the fuel reforming reaction heat source and reforming the source fuel (referred to as a fuel flowing chamber) and a cooling jacket. In the fuel flowing chamber, fuel gas is obtained by partially oxidizing more than 20% of a raw fuel, and the source fuel is reformed. Further, the cooling jacket is arranged, adjacent the fuel flowing chamber and outside of the fuel flowing chamber, for leading steam as a cooling medium from at least one hole or a tube into the fuel flowing chamber. Furthermore, the fuel flowing chamber is composed of sub-chambers having different sectional areas. Moreover, the first chamber has a swirling means for generating a swirling flow of the cooling medium.

The above-mentioned fuel reformer includes a source fuel feeding means, a cooling medium feeding means, a first chamber for generating a fuel reforming reaction heat source and reforming the source fuel, and a second chamber arranged adjacent the first chamber and outside of the first chamber, for leading a cooling medium fed by the cooling medium feeding means into the first chamber.

Further, the above-mentioned fuel reformer includes a source fuel feeding means, a cooling medium feeding means, a fuel flowing chamber for generating a fuel reforming reaction heat source and reforming the source fuel, and a cooling jacket adjacent the fuel flowing chamber, for leading steam as a cooling medium fed by the cooling medium feeding means from at least one place into the fuel flowing chamber, wherein more than 20% of a source fuel is partially oxidized.

Furthermore, the above-mentioned fuel flowing chamber is composed of parts having different sectional areas.

Moreover, the first chamber has a swirling means for generating a swirling flow of the cooling medium.

To attain the above-mentioned second objective, the present invention provides a waste-to-energy incineration system, wherein a part of an exhaust gas generated in the incinerator is led to the fuel reformer as an oxidizer together with air or oxygen. Further, at least a part of the exhaust gas generated in the incinerator is led to the combustor as an oxidizer together with air or oxygen.

To attain the above-mentioned third objective, the present invention provides a waste incineration processing system, comprising:

an incinerator for burning waste;

a boiler in the incinerator, for generating steam with exhaust heat generated in the incinerator;

a steam utilizer utilizing steam generated in the boiler; and a fuel reformer;

wherein fuel reformed by the fuel reformer is injected into the incinerator, and burned.

Moreover, the present invention provides a waste incineration processing system, comprising:

an incinerator for burning waste;

a boiler for generating steam;

a fuel reformer for reforming fuel; and a combustor for burning fuel gas which is reformed by the fuel reformer, and at least a part of an incinerator exhaust gas;

wherein steam generated in the boiler is led into the fuel reformer.

DETAILED DESCRIPTION OF THE EMBODIMENTS

Figure 1:
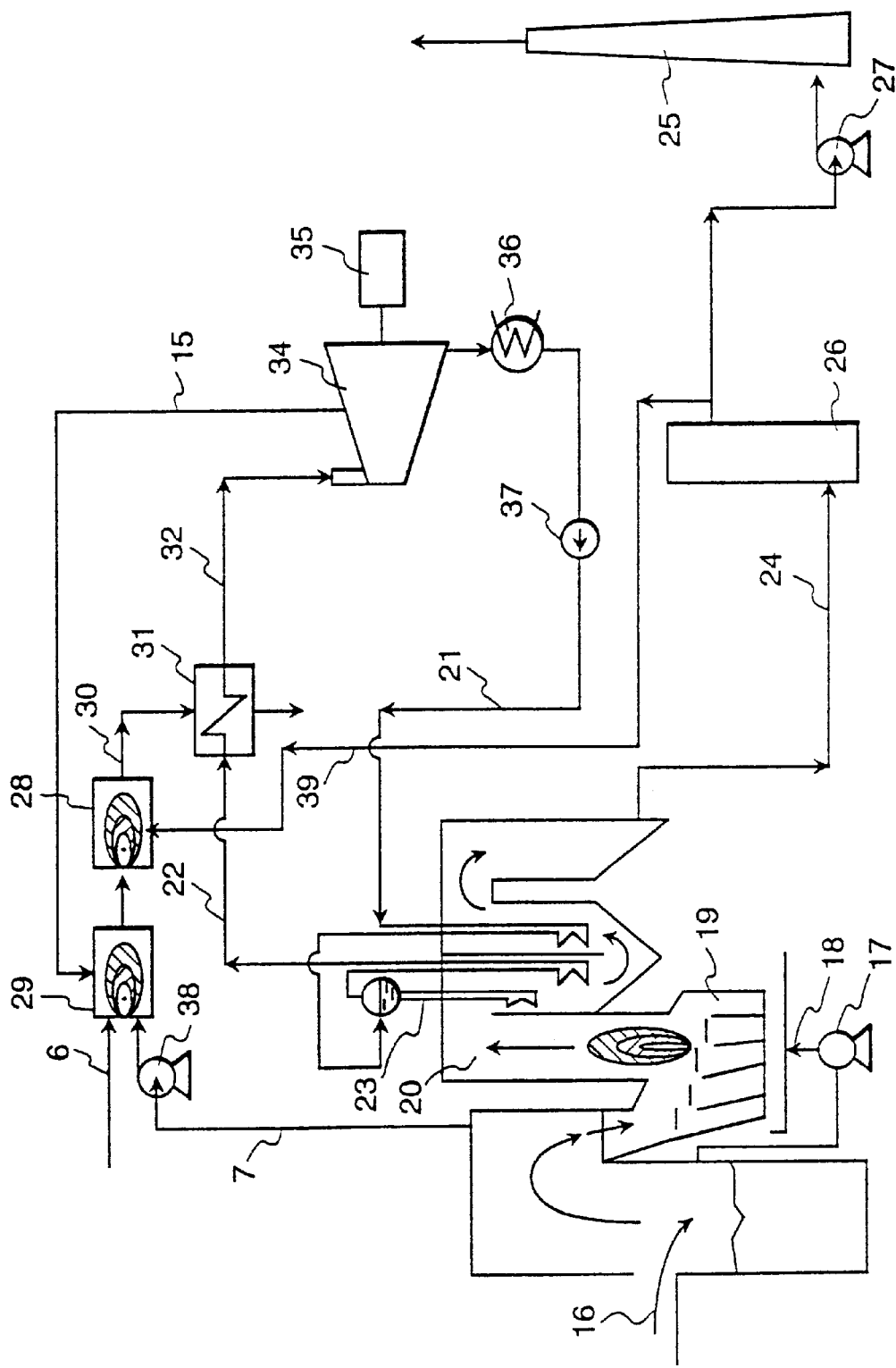
FIG. 1 is a system diagram of a waste-to-energy incineration system of an embodiment according to the present invention.
Figure 2:
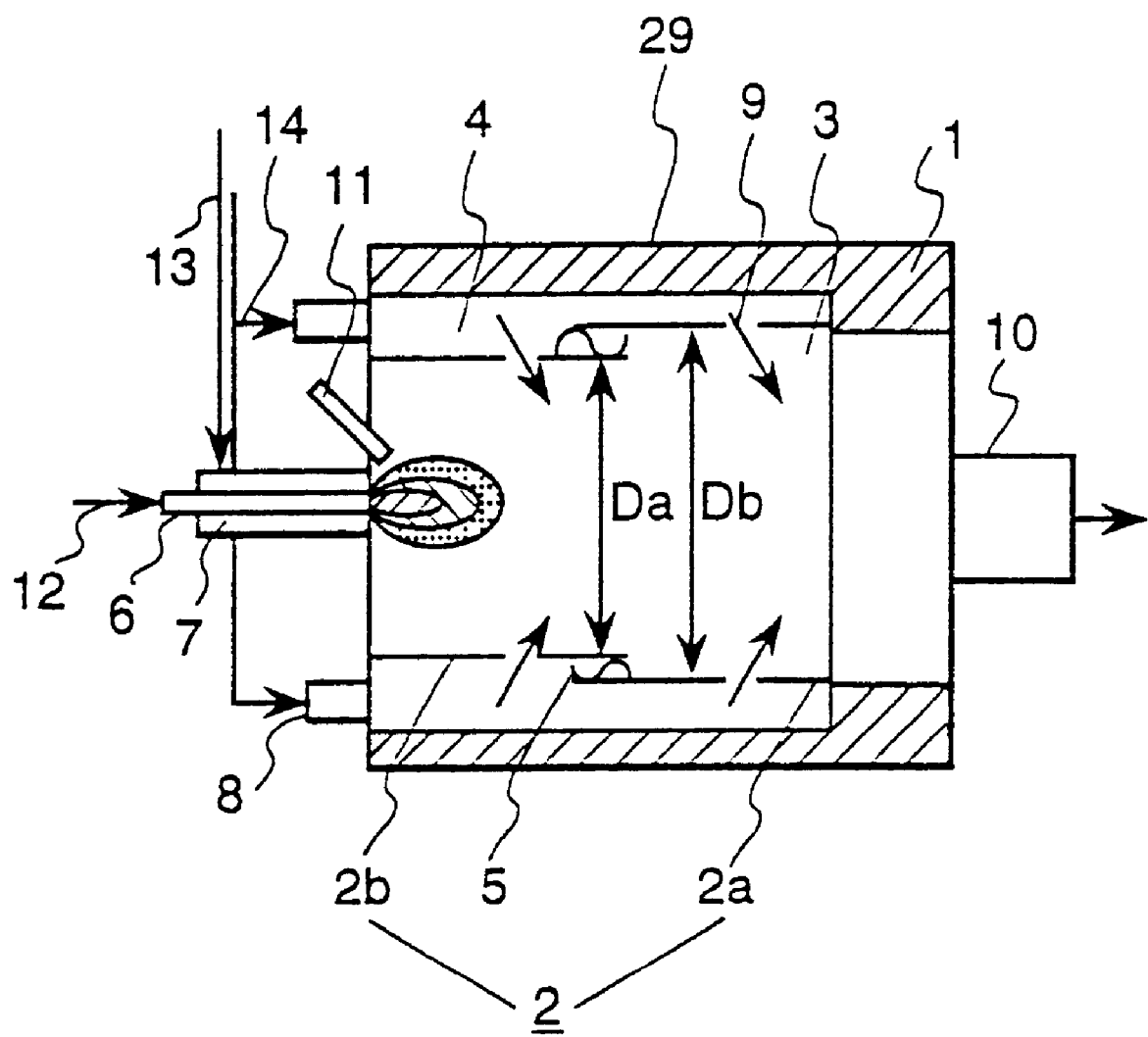
FIG. 2 is a vertical sectional view of a fuel reformer of the embodiment of FIG. 1.

At first, details of the present invention will be explained with reference to an embodiment shown in FIG. 1–FIG. 4. FIG. 1 is a system diagram of a waste-to-energy incineration system of an embodiment according to-the present invention, and FIG. 2 is a vertical sectional view of a fuel reformer of the embodiment of FIG. 1. In each of FIG. 3–FIG. 5. Variation of the waste-to-energy incineration system shown in FIG. 1, are shown.

As shown in FIG. 1, the waste-to-energy incineration system is divided into two main systems, that is, a steam turbine system and an exhaust gas system including a fuel reformer. In an incinerator 19, a part for storing waste 16 is provided, and air is injected into the incinerator 19 through the part for storing waste 16 by a compressor fan 17. The air injected into the incinerator 19 is used as waste burning air. The burned waste gas 20 generated in the incinerator is sent to a dust collector 26 via an exhaust gas pipe 24 after flowing through an incinerator boiler 23.

An air feeding pipe 7 is provided at the part for storing waste 16 and is connected to a fuel reformer 29 to which a fuel feeding pipe 6 is connected. In the downstream of the fuel reformer 29, a combustor 28 is connected to the fuel reformer 29. Further, the down stream of the combustor 28 is connected to a superheater 31 by a burned-up waste exhaust gas pipe 30. Steam passes through the superheater 31, and flows into a steam turbine 34 via superheated steam pipe 32. A generator 35 connected to the steam turbine 34 is rotatably driven by the rotation of the steam turbine by superheated steam passing through the superheated steam pipe 32, and the rotated generator 35 generates electrical power. A part of the steam flowing in the steam turbine 34 and rotating the turbine 34 is extracted and fed back to the fuel reformer 29 through a pipe 15. The rest part of the steam is led to a condenser 36 after rotating the steam turbine 34 and condensed to water. The condensed water is fed to the incinerator boiler 23 by a feed water pump 37 via a feed water pipe 21.

Further, dust in the burned-up waste gas 20 sent to the dust collector 26 is collected by the dust collector 26. A part or the whole of the burned-up waste gas 20 is fed to the combustor 28 after passing through the dust collector 26. The rest of the gas is sent to an exhaust gas stack 25 by an induced fan 27, and is discharged from the stack 25.

The composition of the fuel reformer is shown in FIG. 2. The outside of the cylindrical fuel reformer 29 is covered by an insulator layer 1, and a fuel flowing chamber 3 surrounded by cylindrical partitions 2a and 2b in the central line axis direction is provided. The insulator layer 1 is provided to prevent heat from dissipating, for example, by radiating from the fuel reformer 29. The insulator layer 1 may be comprised of a heat insulation material such as glass wool, ceramic wool, etc. The cylindrical partitions 2a and 2b are composed of two different diameter parts. A cooling jacket 4 is provided inside of the insulation layer and outside of the partitions. The partitions 2a and 2b can be freely expanded and contracted in the horizontal direction by inserting a spacer 5 between the two partitions 2a and 2b.

Further, the fuel feeding pipe 6 and the air feeding pipe 7 are provided in the vicinity of the central axis part in the upper stream portion of the fuel flowing chamber 3, and these pipes form an entrance from which a fuel-steam mixture gas is injected into the fuel flowing chamber 3. The gas injected into the fuel flowing chamber 3 is ignited by an ignitor 11. A cooling medium, namely, cooling steam is provided through feeding pipe 8 in the upper stream portion of the cooling jacket 4. Further, a plurality of injection holes 9 are provided in the partitions 2a and 2b so that the cooling steam entering the cooling jacket 4 is injected into the fuel flowing chamber 3. Furthermore, a fuel exit 10 for ejecting the fuel gas including hydrogen, reformed in the fuel reformer, is provided in the down stream, and is connected to the combustor 28 as mentioned above.

In the following, operation of the fuel reformer 29 having the above-mentioned construction is explained. A mixture gas 12 of a fuel such as hydrocarbon (heavy oil is used as the fuel in this embodiment) mixed with steam at a predetermined ratio is fed to the fuel flowing chamber 3 via the fuel feeding pipe 6, and air 13 is fed to the fuel flowing chamber 3 via the air feeding pipe 7. Further, the mixture gas 12 and the air 13 are ignited by the ignitor 11, and diffused combustion is generated and continued. The flow rate of the air 13 fed to the fuel flowing chamber 3 via the air feeding pipe 7 is adjusted so as to burn more than 20% of the mixture gas 12 (gas obtained by evaporating heavy oil used as fuel fed to the fuel flowing chamber 3 via fuel feeding pipe 7. The mixture gas 12 is partially burned, and a high temperature fuel gas including non burned-up gas and reaction heat necessary to reform the fuel gas is simultaneously obtained. The mixture gas 12 fed to the fuel flowing chamber 3 via the fuel feeding pipe 6 is obtained by mixing fuel such as a hydrocarbon with steam at a predetermined ratio. It is possible to set the mixing timing before fuel and steam are fed into the fuel feeding pipe 6 or when both fuel and steam are fed into the fuel feeding pipe 6 from predetermined places of the pipe 6.

Further, steam 14 is fed into the cooling jacket 4 via the cooling medium feeding pipe 8. The steam 14 fed into the cooling jacket 4 cools the cylindrical partitions 2 exposed to the high temperature fuel gas to be reformed, from the outside of the partitions 2. After cooling the cylindrical partitions 2, the steam 14 fed into the cooling jacket 4 is injected from a plurality of injection holes 9 into the fuel flowing chamber 3, and is mixed with the high temperature fuel gas generated by burning the mixture gas. With the heat of burning fuel and the steam 14, the reaction shown in the following equation (1) occurs, and the fuel gas is reformed so as to include hydrogen. The reaction is called a steam reforming reaction, and the reaction is an endothermic reaction, in which the mixture of hydrocarbon and steam is changed to gas including hydrogen.

The reaction equation (1) is:

$$C_mH_n + sH_2O \rightarrow hH_2 + c1CO + c2CO_2 - \Delta Q \qquad (1)$$

where, $C_mH_n$ is hydrocarbon contained in heavy oil, s, h, c1 and c2 are coefficients, and $\Delta Q$ is the reaction heat.

The gas including hydrogen, obtained by the abovementioned process is fed to the combustor 28 from the fuel exit 10.

As mentioned above, the fuel reformer of the embodiment the cooling jacket 4 is arranged so as to surround the fuel flowing chamber 3 formed with the cylindrical partitions 2, and the steam 14 is fed into the cooling jacket 4 to cool the partitions 2 so that the partitions 2 are cooled from their outside. Therefore, the partitions 2, heated to a high temperature by the high temperature fuel gas are protected by the above-mentioned cooling method. Thus, the high temperature heat-proofing reliability of the fuel reformer 29 is improved in this embodiment. That is, since the second chamber in which the cooling jacket 4 is provided, cools the fuel flowing chamber 3 from its outside by feeding the steam 14 as cooling medium into the cooling jacket 4, the fuel flowing chamber 3 exposed to the high temperature fuel gas is protected from damage by the high temperature fuel gas. Further, after cooling the partitions 2 of the fuel flowing chamber 3, the temperature of the steam 14 is increased to a temperature adequate for reforming fuel, and is mixed with the fuel gas to be reformed. Furthermore, the fuel gas mixed with the heated steam 14 is reformed with the heat generated by partially oxidizing (combustion) more than 20% of the source fuel.

Moreover, since a diffused combustion method method is used, the mixture gas fed from the fuel feeding pipe 6 and the air 13 fed from the air feeding pipe 7 are certainly ignited. That is, the combustion range in the fuel concentration can be made so wide that fuel can be burned in its combustible range, since by feeding the mixture gas 12 (fuel) and the air 13 separately, it is possible to adjust the amounts of air and fuel to be fed, respectively. Thus, by adopting the diffused combustion method, it is possible to certainly ignite the fuel mixture gas, due to the widened combustible range of the fuel.

Although the mixture of source fuel and steam is fed to the reformer through the pipe 12 in the above-mentioned embodiment, it is also effective to feed the mixture of source fuel and steam through the pipe 8, and to feed only fuel through the pipe 12 and mix it with air fed through the pipe 7, which is burned for generating fuel reforming reaction heat source.

After ignition, since it is possible to keep fuel combustion in the fuel flowing chamber 3 with the combustion heat generated by the ignition, the reliability of fuel reforming in the fuel flowing chamber 3 of the fuel reformer 29 is improved. The fuel flowing chamber 3 is formed by the first cylindrical partition 2a and the second cylindrical partition 2b having different diameters, respectively. Diameter Da of the first cylindrical partition 2a is smaller than diameter Db of the second cylindrical partition 2b. The cylindrical partitions having the different diameters, respectively, are overlapped at their inner end or terminal parts. Since a gap part is formed between the two overlapped terminal parts of the two cylindrical partitions 2a and 2b having the different diameters, respectively, a resilient spacer 5, of which a sectional view is a S character shape, is inserted into the gap so as to elastically support the two cylindrical partitions having the different diameters. As to sizes of the diameters, for example, Da and Db are set to 350 mm and 370 mm, and the gap is set to about 10 mm. The spacer 5 is usually called a spring seal, and in the case where the cylindrical partitions having different diameters, respectively, are overlapped, fluid is prevented from leaking out of the gap formed between the two overlapped parts by line contacts in the circumferential direction formed by the spacer 5. The spacer is machined so as to have slit type cuts in the central axis direction has the elasticity, and is called a usually used flared seal. Since the cylindrical partitions 2 are cooled from their outsides by the steam 14 and heated from their insides by the high temperature fuel gas to be reformed, both expansion and contraction strains act on the partitions 2. Accordingly in order to absorb the expansion and the contraction, the fuel flowing chamber 3 is formed by the first partition 2a the and second partition 2b having different diameters, whereby an allowance for the simultaneously occurring expansion and contraction is available for the partitions 2. The abovementioned structure composing the fuel flowing chamber 3 can prevent a strength degradation of itself, and does not have a bad effect on other members of the fuel reformer 29, thereby improving the lifetime of the components of the fuel reformer 29. Thus, the reliability in heat-proofing of the fuel reformer 29 is improved. Moreover, since the fuel flowing chamber 3 possesses a plurality of fuel flowing serial sub-chambers having different diameters, thermal strain changes due to the expansion and the contraction occurring in the members composing the plurality of fuel flowing sub-chambers caused by changes of the amount of the exhaust gas or the generated heat is also suppressed by adjusting the amounts of the fed fuel and the fed steam.

In the following, operation of the waste-to-energy incineration system using the above-mentioned fuel reformer is described. With feed-water led through a feed water pipe 21 from the steam turbine system, steam is obtained by heat exchange in the incinerator boiler 23 by using the burned-up waste gas 20 generated by burning waste 16 with air 18 pushed into the incinerator 19 by the compressor fan 17. Dust, NOx, etc. included in the exhaust gas output from the incinerator 19 are removed by the dust collector 26, and a part or the whole of the cleaned-up exhaust gas is extracted from a gas stream after the dust collector 26. The extracted exhausted gas is led to the combustor 28, and is used in place for air. The rest of the exhaust gas is discharged from the exhaust stack 25 to the atmosphere by the introduction fan 27.

The exhaust gas system is also utilized to superheat steam generated in the incinerator boiler 23, with exhaust gas generated by burning the fuel gas. The mixture gas is obtained by mixing gas or mist fed from the fuel feeding pipe 6, which is gained from an evaporated heavy oil as the source fuel, with air fed from the air feeding apparatus 38. By using the mixture gas, gas including hydrogen is obtained by reforming fuel gas gained by partially oxidizing more than 20% of the source fuel (partial combustion) with steam extracted from the steam turbine 34 and fed, into the fuel reformer 29. Further, in the combustor 28, the exhaust gas 39 extracted from the gas flow after the dust collector 26, is burned with the gas including hydrogen, obtained in the fuel reformer 29. In the process, the system is composed so that the exhaust gas 39 resides for more than 1 sec. under the condition of a temperature higher than 700° C., so that dioxin in the exhaust gas 39 is decomposed, and the exhaust gas 39 which is passed through the superheater 31, is discharged to the atmosphere. In this embodiment, the combustion performance of the combustor 28 is improved by using the gas reformed by the fuel reformer 29. Thus, the fuel gas improved in combustibility by reforming fuel a high helps the incinerator exhaust gas to burn completely at temperature for a predetermined time so as to decompose perfectly the dioxin in the incinerator exhaust gas. Furthermore, the burned-up exhaust gas generated in the combustor 28 is also used as a superheating heat source for the superheater 31 in which steam generated in the incinerator boiler 23 is superheated.

In the steam turbine system, the steam turbine 34 is driven by the steam superheated in the superheater 31, and the generator 35 driven by the steam turbine 34 generates power. The steam which has driven the steam turbine 34 is condensed into water in the condenser 36 and the condensed water is fed to and utilized in the incinerator 19.

Further, in this embodiment, Dioxin included in the exhaust gas is decomposed. Further, the cleaned-up exhaust gas is passed through the superheater 31, and increases the temperature of the about saturated steam of 300° C. at the pressure of 30 ata, which is generated in the incinerator boiler 23, to about 500° C. Since the heat difference between the superheated steam and the condensed water is expanded by the above-mentioned steam superheating process, a high efficiency of the power generation system can be realized by increasing the output power and the efficiency of the steam turbine.

Furthermore, since an additional heat source and an apparatus generating the heat source can be omitted by using the steam extracted from the steam turbine 34 as the steam for reforming fuel in the fuel reformer 29, a waste-to-energy incineration system realizing a high reliability can be provided.

Figure 3:
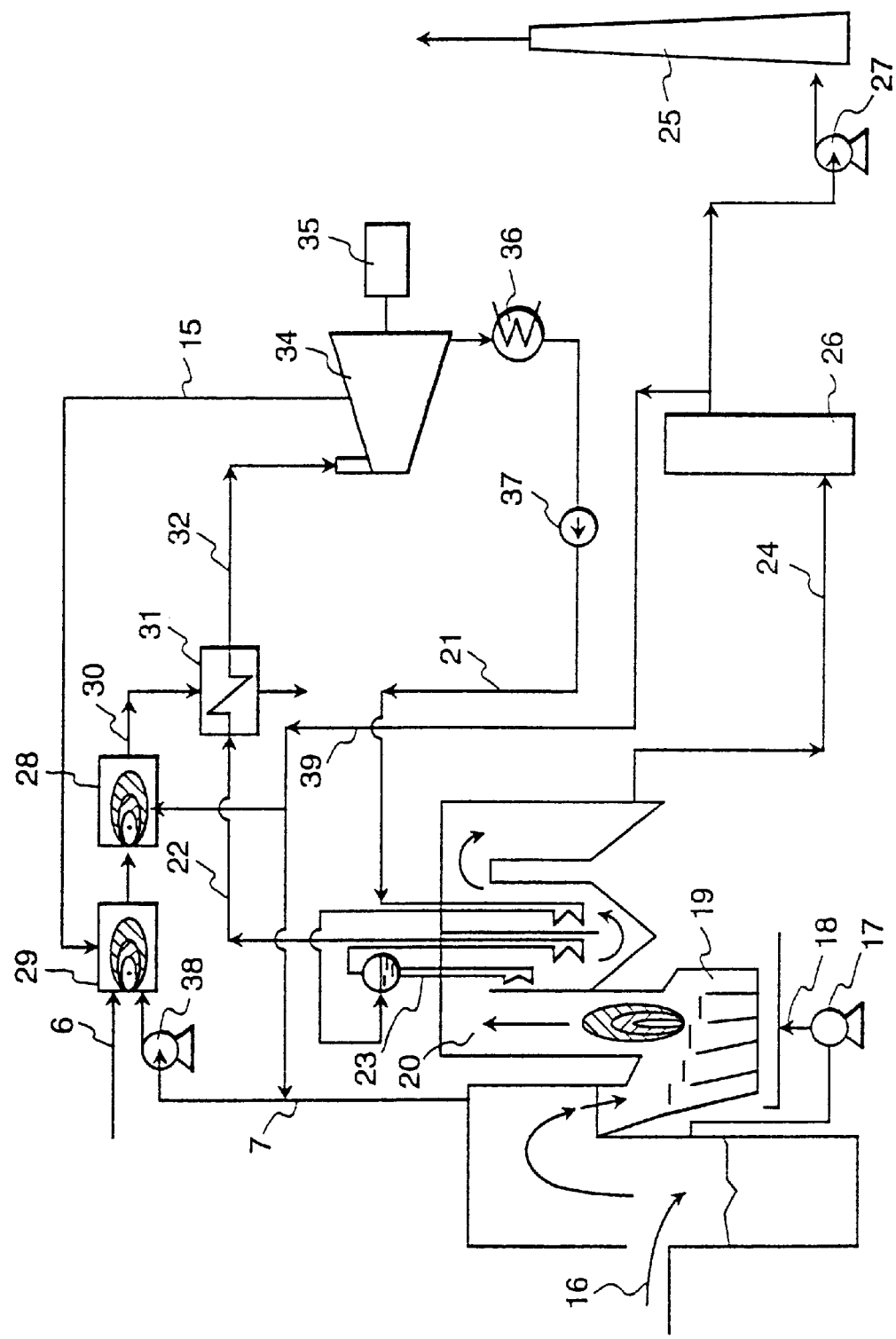
FIG. 3 is a variation of the system shown in FIG. 1.

FIG. 3 is a variation of the embodiment shown in FIG. 1, in which a part of the exhaust gas fed to the combustor 28 is injected into the air feeding pipe 7 for feeding air, so as to be fed to the fuel reformer 29.

The above-mentioned construction has an effect of contributing to the efficiency improvement of the fuel reformer 29 since the temperature of air can be increased by using the exhaust gas.

Figure 4:
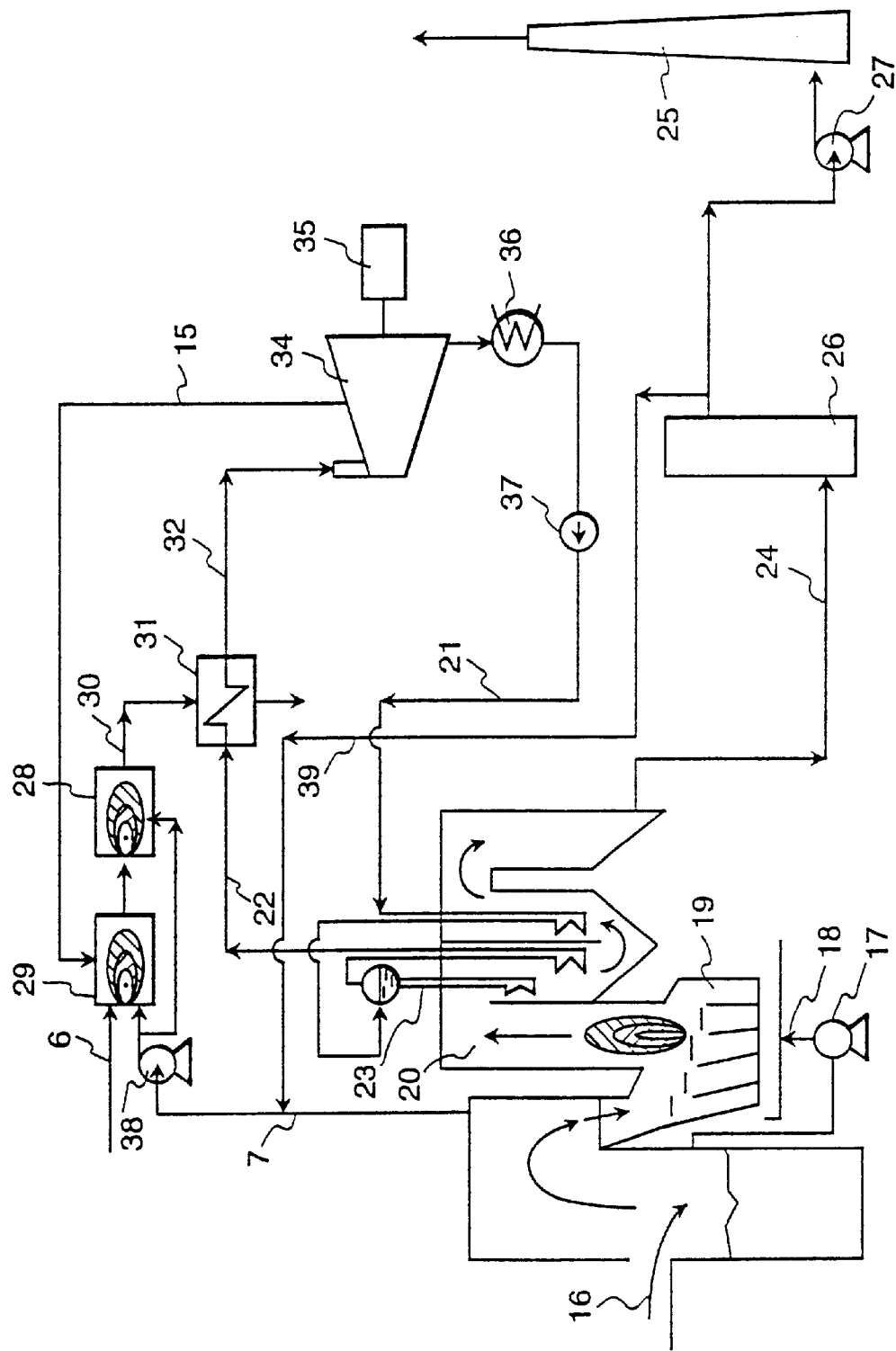
FIG. 4 is another of variations of the system shown in FIG. 1.

FIG. 4 is another variation of the embodiment shown in FIG. 1, in which the incinerator exhaust gas 39 is injected into the air feeding pipe 7 for feeding air to the fuel reformer 29. Further, an air stream is branched after the air feeding apparatus 38, and one of the to branches air atriums is fed to the reformer 29 and the other to the combustor 28.

By using the above-mentioned construction, it is possible to adjust the respective flow rates of the mixture gas of air and exhaust gas fed to the fuel reformer 29 and the combustor 28, corresponding to the mixture gas flow rate needed in each of the fuel reformer 29 and the combustor 28. Therefore, this construction has also an effect of contributing to realization of a high reliable waste-to-energy incineration system in which fuel is stably burned and reformed even at states of a low amount of the exhaust gas or an extremely low oxygen concentration of the exhaust gas. Furthermore, since the stable temperature necessary to decompose dioxin can be kept, even at a state of an extremely low oxygen concentration of the exhaust gas, by mixing the exhaust gas fed to the combustor 28 with air, it becomes possible to realize a highly efficient waste-to-energy incineration system having an excellent dioxin decomposing function.

Figure 5:
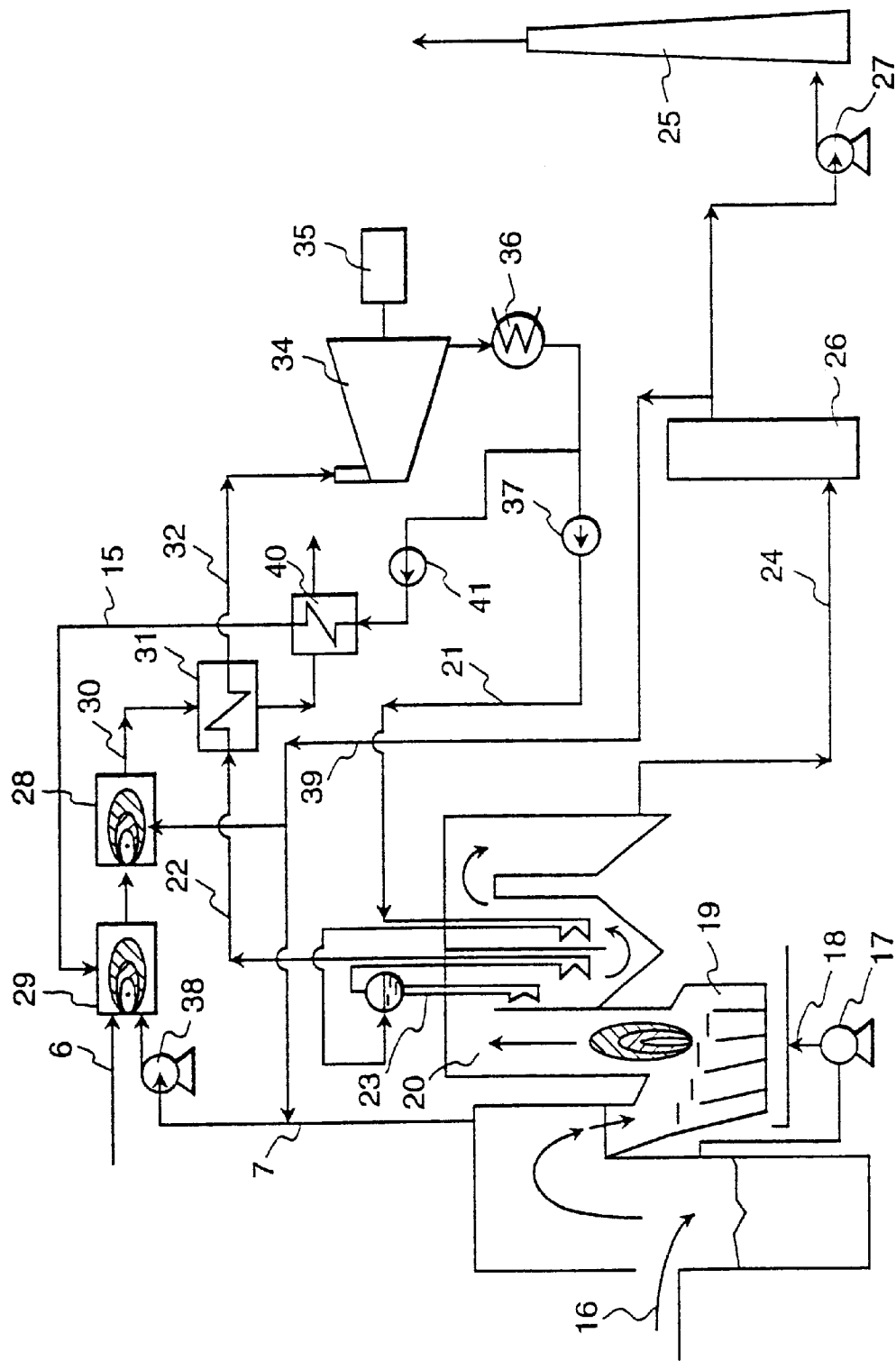
FIG. 5 is a system diagram of a waste-to-energy incineration system of another embodiment according to the present invention.

In the following, other embodiments of the present invention are explained by referring to FIG. 5–FIG. 7. FIG. 5 shows a construction of a waste-to-energy incineration system of another embodiment, and FIG. 6 shows of a construction of one variation of the embodiment shown in FIG. 5.

As shown in FIG. 5, in the waste-to-energy incineration system of this embodiment, the steam fed to the fuel reformer 29 is not extracted from the steam flowing in the steam turbine 34, but the steam obtained by exchanging heat of the exhaust gas which passed through the superheater 31, with a part of the condensed water, in a feed water evaporator 40, and fed to the fuel reformer 29. That is, in this embodiment, water fed by a feed water pump 41 is evaporated during passage through the feed water evaporator 40, and fed into the fuel reformer 29.

The above-mentioned construction has an effect of contributing to improvement of fuel and to realization of a highly efficient waste-to-energy incineration system, since it is possible to feed steam to the fuel reformer 29 without decreasing the output of the steam turbine 34 due to steam extraction from steam flowing in the steam turbine 34. Further, it is possible to feed steam to the fuel reformer 29 under the optimal conditions of temperature and pressure because of independency from any constraint as to steam extraction.

Figure 6:
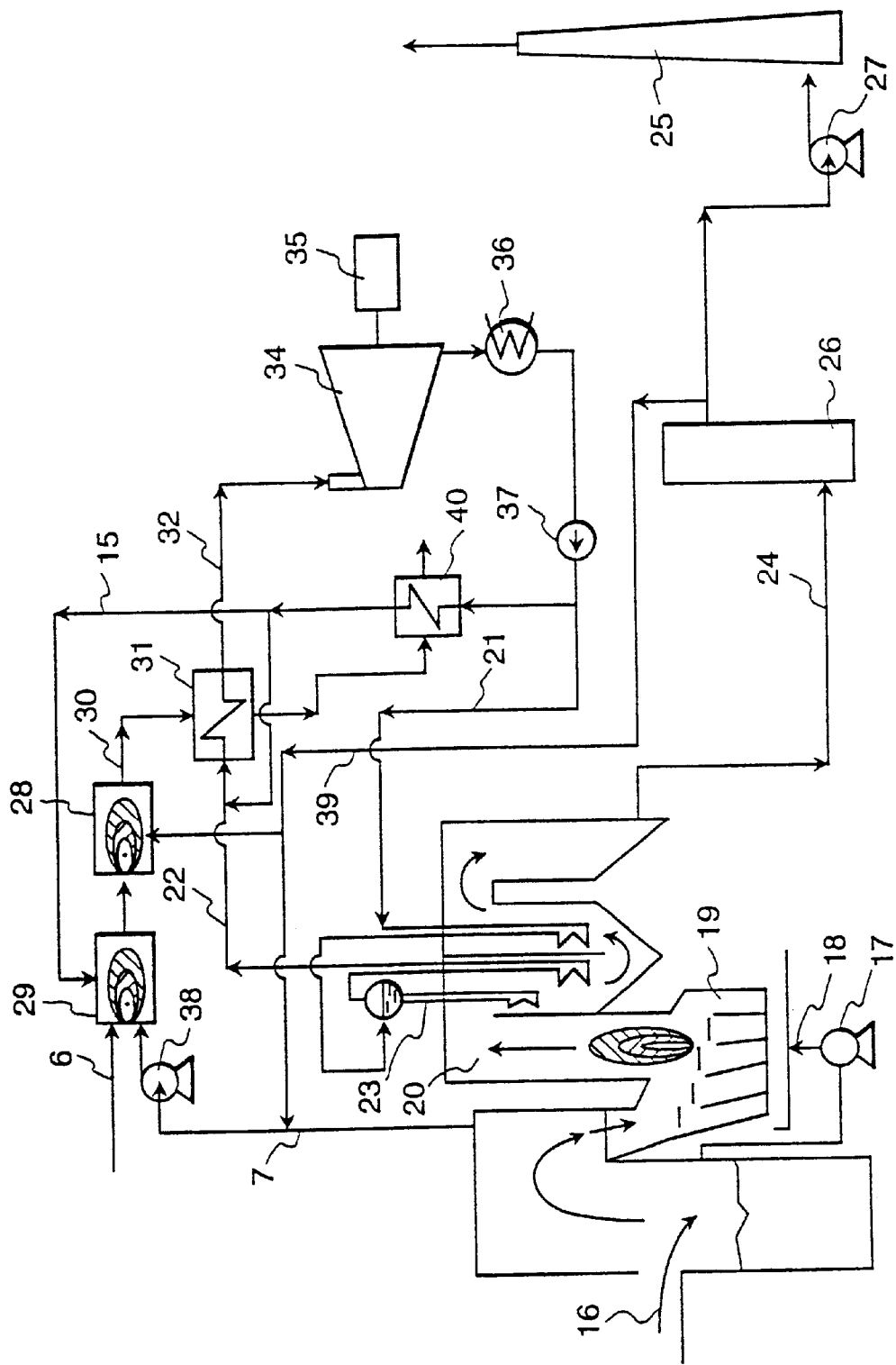
FIG. 6 is a variation of the system shown in FIG. 5.

FIG. 6 shows a variation of the embodiment shown in FIG. 5, in which a part of feed water flow branched at the feeding water flow after the feed water pump 37 is led to the feed water evaporator 40. The feed water flow passing through the feed water evaporator 40 is changed to a steam flow, and the steam flow is branched into two steam flows. One of the steam flows is mixed with the steam from the incinerator boiler 23, and the other one is fed to the fuel reformer 29. A heat source of the feed water evaporator 40 is the exhaust gas flowing after the superheater 31, and the heat in the exhaust gas is recovered by the feed water evaporator 40.

By using the above-mentioned construction, a highly efficient waste-to-energy incineration system is realized since the steam flow rate driving the steam turbine 34 can be increased by generating steam fed to the superheater 31 with the exhaust gas output from the combustor 28. Further, a more highly efficient waste-to-energy incineration system is realized since the output power is increased by increasing the steam fed to the fuel reformer 29 by using the evaporated feed water, in addition to the increase of steam flowing in the steam turbine 34.

Another embodiment of the present invention is explained by referring to FIG. 7 as follows. FIG. 7 shows a system diagram of a waste-to-energy incineration system of this embodiment.

Figure 7:
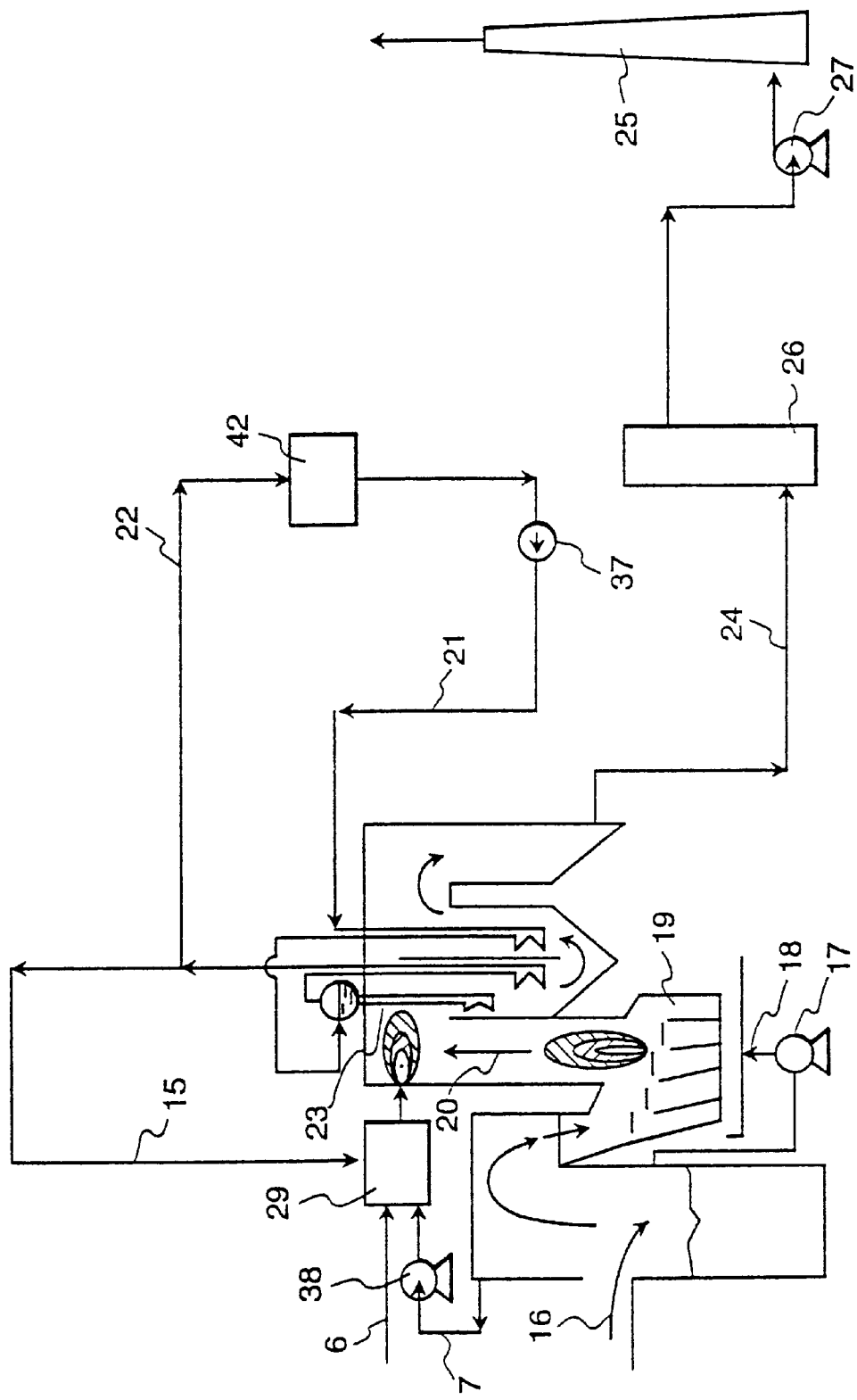
FIG. 7 is a system diagram of a waste-to-energy incineration system of still another embodiment according to the present invention.

As shown in FIG. 7, fuel gas output from the fuel reformer 29 is injected into the incinerator 19, and the second fuel burning is performed in the incinerator 19. Further, differently from the embodiments shown in FIG. 1–FIG. 6, gas exhausted from the incinerator 19 is not fed to the fuel reformer 29, and discharged from the exhaust stack 25 via the dust collector 26 and the induction fan 27. Moreover, a steam system is composed of the incinerator boiler 23, a steam utilizer 42 (a steam turbine, a cooler utilizing steam, a warm water swimming pool, etc. and a feed water pump 37. Further, steam is extracted from a place in the steam system and fed to the fuel reformer 29.

By using the above-mentioned costruction, since it is possible to make a long and large region of the high temperature at which dioxin can be decomposed in the incinerator 19, which also makes the resident time of the exhaust gas in the above-mentioned high temperature region long, the temperature and time necessary to decompose dioxin is secured. Thus, a highly efficient waste-to-energy incineration system having an excellent dioxin decomposing function can be realized. Moreover, since the high temperature burning-up region is enlarged and elongated, the time necessary for the exhaust gas to pass the high temperature region becomes longer. If the above-mentioned resident time increases, dioxin decomposition reaction exponentially progresses. A waste processing system having an incinerator capable of greatly reducing dioxin can be provided. Thus, by applying this embodiment, it is possible to provide a waste incinerator or a waste-to-energy incineration system discharging little hazard material to the environment.

As explained above, by using the present invention, since low heat valued fuel gas, included in the burned-up gas used for superheating steam generated in an incinerator boiler, can be generated by burning fuel gas obtained by reforming liquid fuel, so as to burn more than 20% of the source fuel, it is possible to form a stable high temperature burning-up field, namely, a dioxin decomposing field. Thus, it has become possible to provide a highly efficient and reliable waste-to-energy incineration system capable of almost completely reducing dioxin and efficiently recovering exhaust heat generated in the system.

What is claimed is:

1. A waste-to-energy incineration system, comprising:
an incinerator for burning waste;
a boiler in said incinerator for generating steam with exhaust heat generated in said incinerator;
a steam utilizer for utilizing steam generated in said boiler; and
a fuel reformer for reforming fuel; and
wherein fuel gas reformed by said fuel reformer is fed to said incinerator.

2. A waste incineration processing system, comprising:
an incinerator for burning waste;
a boiler in said incinerator for generating steam with exhaust heat generated in said incinerator;
a steam utilizer for utilizing steam generated in said boiler; and
a fuel reformer; and
wherein fuel reformed by said fuel reformer is injected into said incinerator, and burned.

3. A fuel reformer, comprising:
an entrance for feeding a mixture gas of raw fuel and steam;
a first chamber, formed in a cylindrical shape by a cylindrical partition, for reforming the mixture gas fed from said entrance into reformed gas;
a second chamber for cooling said cylindrical partition from the outside thereof by steam fed from a cooling medium feeding pipe; and
a swirling means for generating a swirling flow of the steam having cooled said cylindrical partition and feeding the steam to said first chamber.

4. A fuel reformer, comprising:
a mixing gas feeding pipe for feeding mixture gas of raw fuel and steam;
a fuel flowing chamber, formed in a cylindrical shape by a cylindrical partition, for reforming the mixture gas fed from said mixing gas feeding pipe into reformed gas;
an idnitor for burning the mixture gas fed to said fuel flowing chamber to generate combustion gas;
a cooling jacket for cooling said cylindrical partition from the outside thereof by steam fed from a cooling medium feeding pipe; and
a plurality of injection holes, formed in said cylindrical partition, for generating a swirling flow of the mixture gas injected into said fuel flowing chamber,
wherein an amount exceeding 20% of the raw fuel is partially oxidized.

5. A fuel reformer according to claim 4, wherein said fuel flowing chamber is composed of fuel flowing chambers, each having a different diameter.

* * * * *